(12) United States Patent
Van Woudenberg et al.

(10) Patent No.: US 6,285,647 B1
(45) Date of Patent: Sep. 4, 2001

(54) METHOD AND DEVICE FOR WRITING AN OPTICAL RECORD CARRIER

(75) Inventors: Roel Van Woudenberg, Eindhoven (NL); Johan P. W. B. Duchateau, Wellen (BE); Hermanus J. Borg, Eindhoven (NL)

(73) Assignee: U.S. Philis Corporation, New York, NY (US)

( * ) Notice: Subject to any disclaimer, the term of this patent is extended or adjusted under 35 U.S.C. 154(b) by 0 days.

(21) Appl. No.: 09/171,089

(22) PCT Filed: Feb. 12, 1998

(86) PCT No.: PCT/IB98/00179

§ 371 Date: Oct. 13, 1998

§ 102(e) Date: Oct. 13, 1998

(87) PCT Pub. No.: WO98/36411

PCT Pub. Date: Aug. 20, 1998

(30) Foreign Application Priority Data

Apr. 10, 1997 (EP) .................................................. 97201033

(51) Int. Cl.$^7$ ........................................................ G11B 7/00
(52) U.S. Cl. ........................ 369/116; 369/53.1; 369/59.17
(58) Field of Search ............................... 369/116, 47, 48, 369/49, 50, 54, 58, 59, 13, 47.1, 53.1, 53.11, 53.37, 53.41, 59.1, 59.17

(56) References Cited

U.S. PATENT DOCUMENTS

| | | | | |
|---|---|---|---|---|
| 5,381,396 | * | 1/1995 | Tanaka et al. | 369/116 |
| 5,457,666 | * | 10/1995 | Toda et al. | 369/116 X |
| 5,590,111 | * | 12/1996 | Kirino et al. | 369/116 |
| 5,608,710 | * | 3/1997 | Minemura et al. | 369/116 |

OTHER PUBLICATIONS

"Improved High–Density Phase–Change Recording", Bernardus A.J. Jacobs and Johan P.W.B. Duchateau, Philips Research Labs, Prof. Holstlaan 4,5656 AA Eindhoven, The Netherlands, JPN. J. Appl. Phys. vol. 36, (1997), pp. 491–494, Part 1, No. 1b, Jan. 1997.

* cited by examiner

*Primary Examiner*—Muhammad Edun
(74) *Attorney, Agent, or Firm*—Michael E. Belk

(57) ABSTRACT

A method for writing an optical record carrier, in which a mark representing recorded data is written in the record carrier by a sequence of radiation pulses. The radiation power has a different level in between the pulses of a sequence and immediately after the last pulses of a sequence. This allows an independent control of the leading and trailing edge jitter of the marks written.

11 Claims, 4 Drawing Sheets

Figure 5:
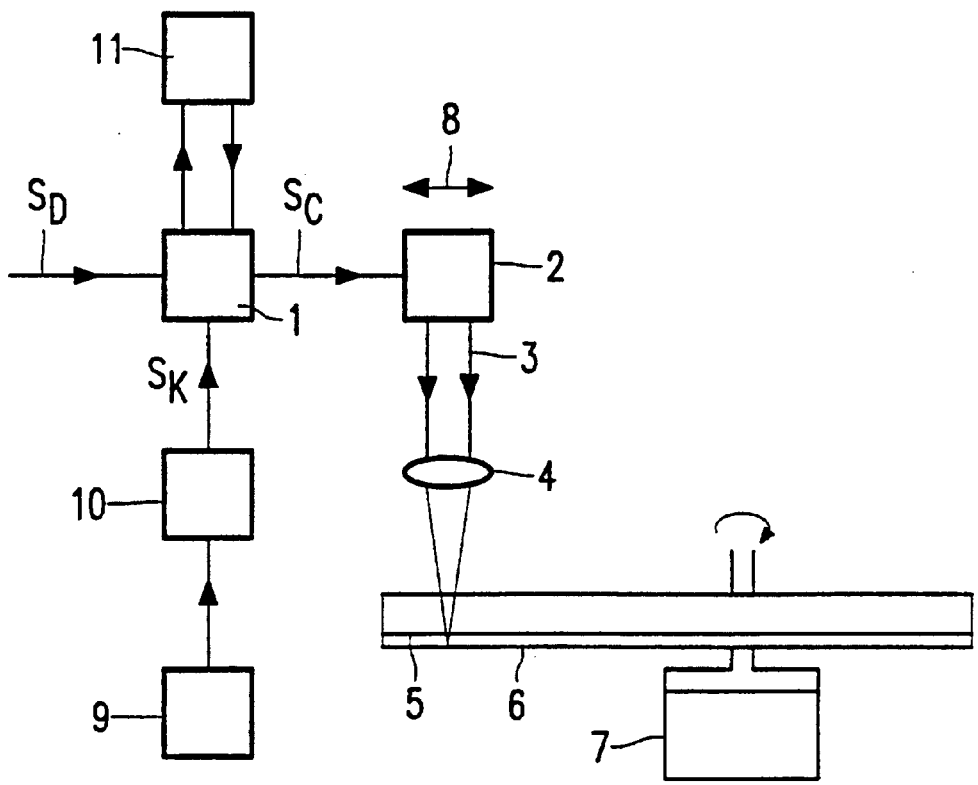

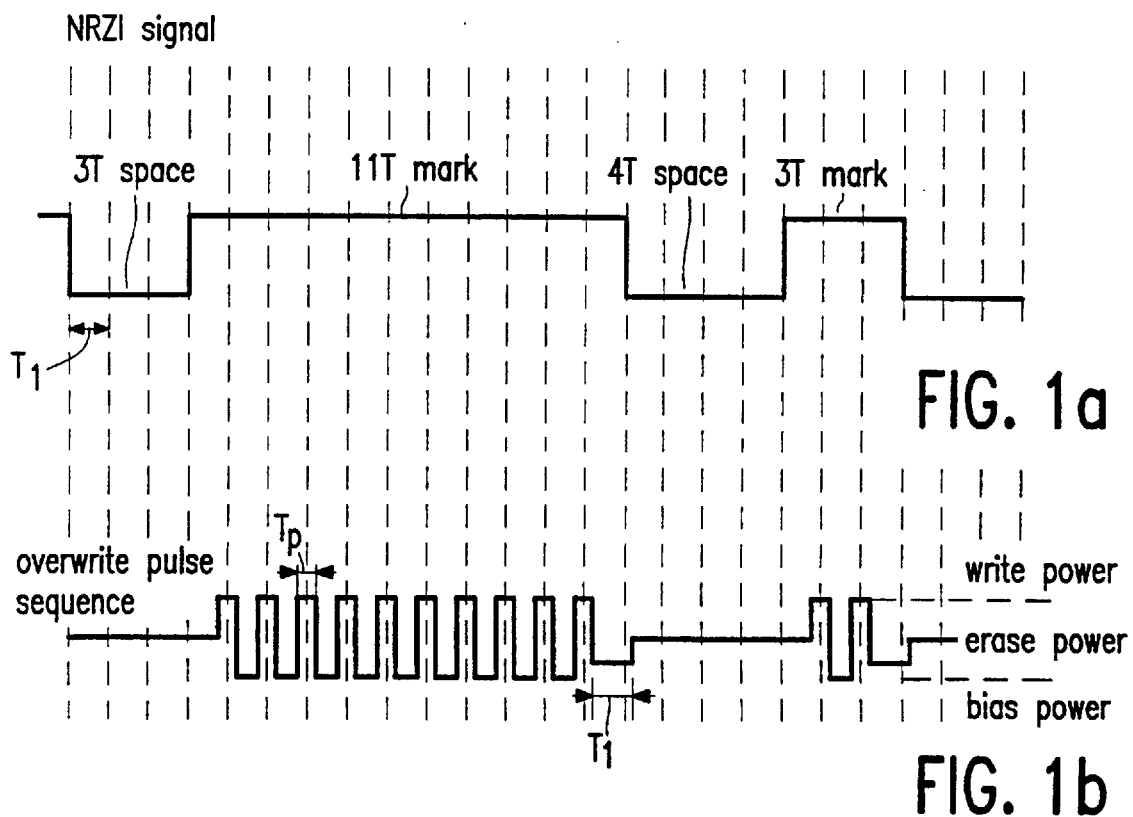
FIG. 1a
FIG. 1b
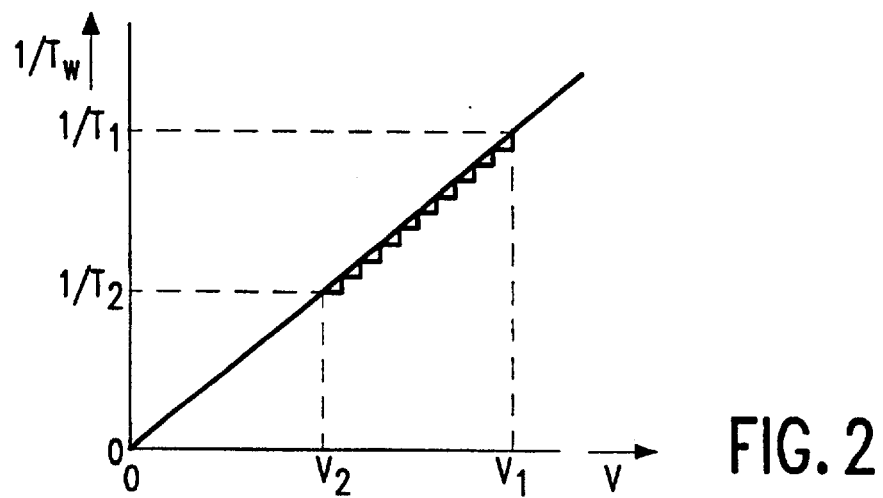
FIG. 2

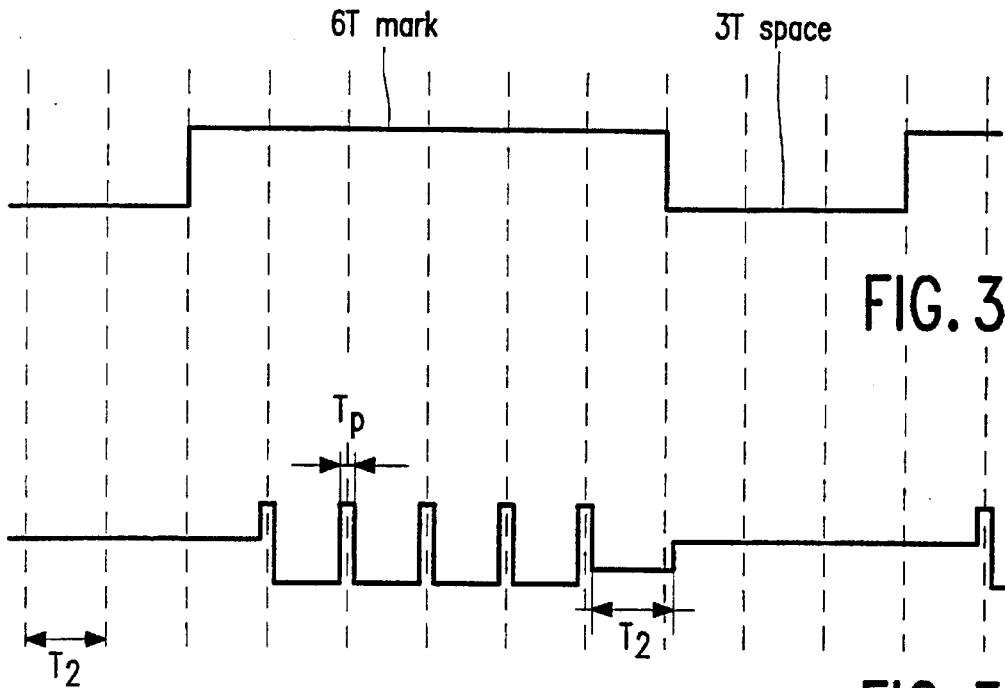
FIG. 3a
FIG. 3b
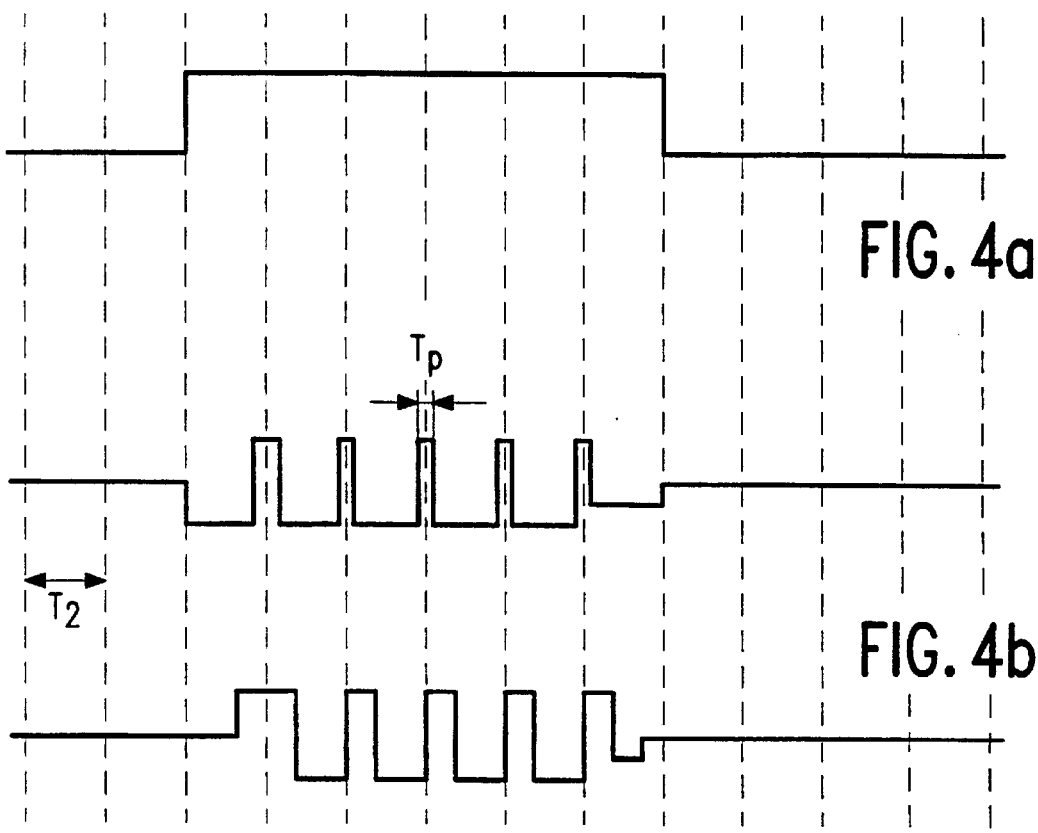
FIG. 4a
FIG. 4b
FIG. 4c

METHOD AND DEVICE FOR WRITING AN OPTICAL RECORD CARRIER

The invention relates to a method of recording marks representing data in an information layer of an optical record carrier by irradiating the information layer by a pulsed radiation beam, each mark being written by a sequence of pulses. The invention also relates to an optical recording device for carrying out the recording method. The method is suitable for direct-overwrite on a record carrier, i.e. by writing information to be recorded in the information layer of the carrier and at the same time erasing information previously written in the information layer. The method can be used in direct-overwriting on an information layer made of a phase-change material.

A recording method according to the preamble is known from the publication "Improved High-Density Phase-Change Recording" by B. A. J. Jacobs et al in the Japanese Journal of Applied Physics, Vol. 36(1997) pp. 491–494. A mark is written by a sequence of write pulses and the previously written marks between the marks being written are erased by applying an erase power in between the sequences. The known sequence has a first power level or bias level between the pulses and a return to the bias level after the last pulse of the sequence before rising to an erase power level. It is a disadvantage of the known method that it does not allow a sufficient reduction of the jitter in the read signal obtained from reading marks written by using the known method. The jitter is the standard deviation of the time differences between level transitions in the digitized read signal and the corresponding transitions in a clock signal, the time differences being normalized by the duration of one period of the clock.

It is an object of the invention to provide a recording method for writing marks having a reduced jitter.

This object is achieved when the method of the preamble is characterised in that the radiation beam has a first power level between the pulses, a second power level after the last pulse of the sequence, followed by a third power level, and in that the first power level is lower than the second power level and the second power level is lower than the third power level.

It has been found that the disadvantage of the known method resides in the fact that the method does not provide an independent control of the jitter caused by the leading edge of a mark and the jitter caused by the trailing edge of a mark. A change of the first or bias level in the known method affects both the leading-edge jitter and the trailing-edge jitter. The method according to the invention introduces a new degree of freedom by making the low power level after the last pulse of a sequence independent of the low power level between the pulses. The first level between the pulses now influences mainly the leading-edge jitter, whereas the second level after the last pulse of the sequence influences mainly the trailing-edge jitter. When the first power level is smaller than the second power level and the second power level smaller than the third power level, the jitter of the marks is smaller than the jitter of marks written by the known method.

The tolerance on the setting of the bias power level in the known method is relatively tight. The reason for this turns out to be that the bias power level and the cooling power level have only partly overlapping tolerance ranges. The known method uses an equal value for the bias power level and the cooling power level. The value selected is a compromise between an optimum bias power level and an optimum cooling power level. Since the compromise value is not optimum for each of the power levels, a small change in the level causes a relatively large change in the jitter, resulting in a small tolerance range. When, according to the invention, both power levels are adjusted separately, each level has a wide tolerance range, simplifying the adjustment and maintenance of a level and making the recording device more tolerant for variations in the properties of record carriers.

The second power level, i.e. the power level immediately after the last pulse of a sequence, is preferably lower than 0.75 times the third power level. The second power level is preferably higher than 0.20 times the third power level. Within this range the cooling of the information layer after the last pulse of a sequence is sufficiently rapid for a proper formation of the mark, and the heating is sufficient for the erasure of the previously written marks immediately after the just written mark.

The first power level, i.e. the level between the pulses in a sequence, lies preferably in a range from 0 to 0.30 times the third power level. It has the advantage that it allows larger duty cycles of the pulses in a sequence, thereby allowing a lower peak output of the radiation source. The difference between the first power level and the second power level is preferably larger than 0.1 times the third power level. In some embodiments the secondpower level is preferably larger than 1.5×the first power level.

When the writing speed used in the method is changed, the duration of the period during which the second power level is maintained, i.e. the so-called cooling period, is preferably made dependent on the writing speed. The cooling period folling the last pulse of the sequence and preceding the start of the erasure at the third power level provides cooling of the information layer at the end of the sequence. If the cooling period is too short, the erasure starts too soon and will erase too much of the just written mark. If, on the other hand, the cooling period is too long, the erasure starts too late and previously written marks immediately following the just written mark will not be erased. There is an optimum duration of the cooling period when writing at a certain speed. When changing the writing speed, it turns out that the duration of the cooling period must be changed in dependence on the writing speed in order to obtain a proper transition from the write operation to the erasure operation.

In general, marks of different lengths are written on a record carrier by pulse sequences of different lengths. If a pulse sequence contains only one pulse, the power level during the cooling period following the single pulse is preferably equal to the second power level.

In a preferred embodiment of the method according to the invention the duration of the cooling period is linearly related to the inverse of the writing speed. Preferably, the length on the information layer corresponding to the cooling period has a constant value, independent of the writing speed and the type of record carrier.

The length on the information layer corresponding to the cooling period depends on the overlap of the areas heated by the last radiation pulse of the sequence and the start of the subsequent erasure. The size of a heated area is proportional to the size of the diffraction-limited spot formed by the focused radiation beam on the information layer. The length of the cooling period is therefore preferably proportional to $\lambda/NA$ and lies in a range from 0.09 to 0.27 times $\lambda/NA$, where $\lambda$ is the wavelength of the radiation and NA is the numerical aperture of the radiation beam incident on the information layer. This means that the cooling period has a duration preferably between 0.09 and 0.27 times $\lambda/(NA\ v)$, where v is the writing speed. In terms of channel-bit periods, the duration of the cooling period lies preferably within the range from $2.85 \; 10^6$ to $8.54 \; 10^6$ times $\lambda/(NA \; v)$, where the two constants have the dimension of $\text{second}^{-1}$. When the duration of the cooling period is chosen in the indicated range, the corresponding length provides such an overlap of the heated areas that the rear edge of the written mark is defined properly. As a result, the jitter on reading the marks is reduced.

The pulses in a sequence for writing a mark have preferably a substantially equal pulse width and a mark is written by a substantially constant number of pulses per unit of length of the mark independent of the writing speed. The control unit of a recording device can be simple, because the number of write pulses for forming a mark of a certain length need not be changed when the writing speed is changed. The combination of a substantial constant pulse width and an equal number of pulses per unit of length of the mark provides an equal amount of radiation energy deposited per unit of length, resulting in the formation of marks which have a width independent of the writing speed. The method is very suitable for writing marks which can only have a discrete number of lengths, for instance a length equal to an integer times a so-called channel-bit length. The number of write pulses for such a mark will then preferably be equal to the number of channel-bit lengths minus one or two.

Small variations in the number of pulses per unit of length of a mark are possible in embodiments where a disc-shaped record carrier rotating at constant angular velocity (CAV) is divided is several zones, each of which is written at a constant angular density and zones at increasing radii are written at increasing angular density.

The constant number of write pulses per unit of length and the equal width of the pulses does not apply to the leading and trailing edge of a mark. These edges, comprising together approximately one to two channel-bit lengths, form transient phenomena which are dealt with in special embodiments of the method according to the invention.

The pulses are preferably synchronised to a data clock signal, the frequency of which depends on the writing speed. When the frequency of the data clock is proportional to the writing speed, a substantially constant linear information density on the information layer can be realised. A coupling of the timing of the pulses to the data clock enables the proper formation of marks at all writing speeds. The coupling can be realised in the control unit by simple electronic means.

A simplification of the control unit of a recording device using the method can be achieved by maintaining the power in the pulses substantially at a predetermined write power level, independent of the writing speed and the lengths of the marks.

At relatively large speed differences, the write power preferably increases with decreasing write speed. The write power preferably has a linear dependence on the write speed. The advantage of this dependence is already noticeable at speed changes of a factor 1.5. A decrease of the writing speed by a factor of two and a half and an associated increase of the write power in the range from 5% to 25% improves the write performance. The higher power compensates the increased cooling at low speeds due to the low duty cycle.

A second aspect of the invention relates to an optical recording device adapted for using the recording method according to the invention. The recording device for recording data in the form of marks on an information layer of a record carrier by irradiating the information layer by a radiation beam, the device comprising a radiation source providing the radiation beam and a control unit for controlling the power of the radiation beam, is characterised in that the control unit is operative for providing a sequence of pulses for writing a mark and controlling the power of the radiation beam such that it has a first power level between the pulses, a second power level after the last pulse of the sequence, followed by a third power level, and in that the first power level is lower than the second power level and the second power level is lower than the third power level.

The objects, features and advantages of the invention will be apparent from the following more particular description of preferred embodiments of the invention, as illustrated in the accompanying drawings.

Figure 6:
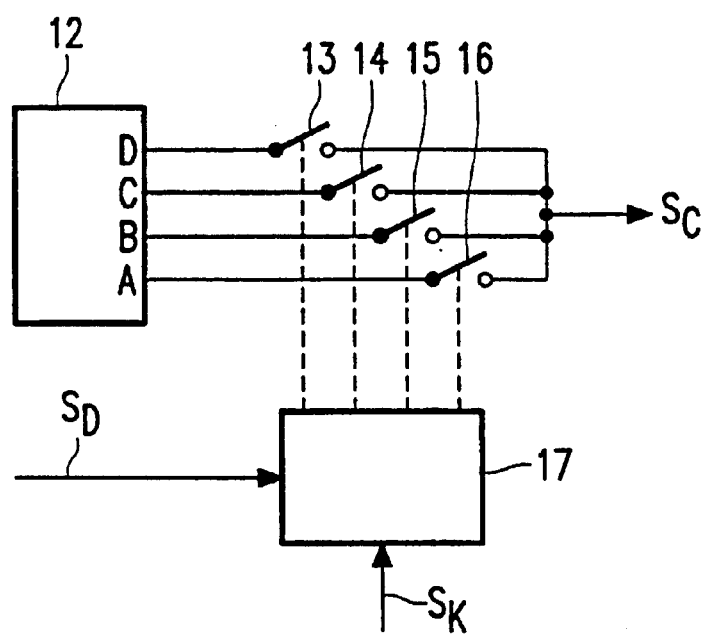
Figure 7:
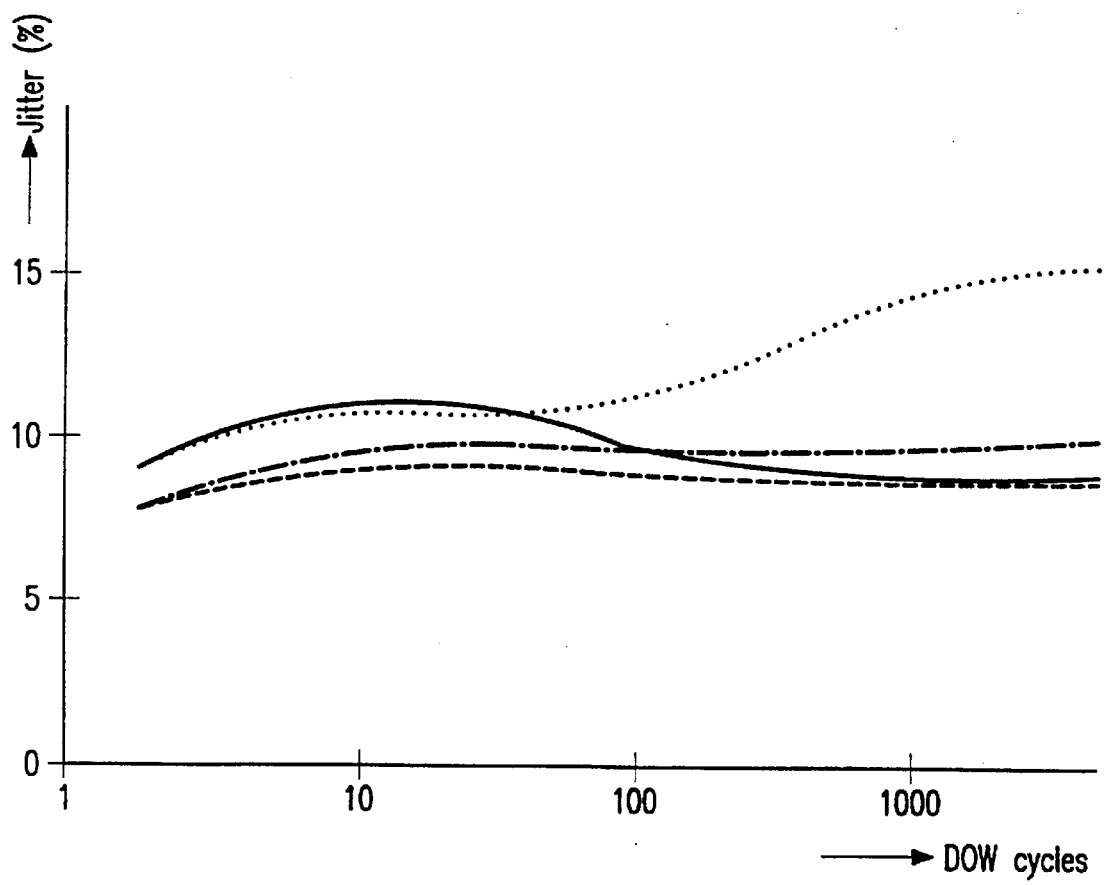

FIG. 1 shows a diagram comprising the time-dependence of the data signal and the control signal, FIG. 2. illustrates the relation between the channel-bit period and the writing speed, FIG. 3. shows a diagram comprising the time-dependence of various signals at a low writing speed, FIG. 4. shows a diagram comprising the time-dependence of various signals at a low writing speed, FIG. 5. is a diagram of a recording device according to the invention, FIG. 6. shows a pulse generator of the recording device, and FIG. 7. is a diagram showing measurements on information written according to the invention.

FIG. 1 shows a diagram comprising two signals as used in the recording method according to the invention. FIG. 1a gives the value of a digital data signal as a function of time, the value of the signal representing information to be recorded. A high level of the signal may correspond to a logical value '1' and a low level to a logical '0', or vice versa. The vertical dashed lines indicate transitions in a clock signal of a data clock belonging to the data signal. The period $T_w$ of the data clock, also called the channel-bit period, is indicated by $T_1$. The data signal changes value from 'high' to 'low' and 'low' to 'high' at transitions of the data clock. The data signal may be a so-called EFM or EFM-plus coded signal, which can be 'low' for periods from $3 \; T_1$ to $11 \; T_1$, and 'high' also for periods from $3 \; T_1$ to 11 T1. When recording the data signal, a 'high' period is recorded as a mark having a length corresponding to the duration or width of the 'high' period, and a 'low' period is recorded as an unwritten area between marks and having a length corresponding to the duration or width of the 'low' period. In general, the length of a mark is substantially equal to the number of channel-bit periods of the data signal times the writing speed. The length of a mark can thus be expressed in channel-bit lengths, one channel-bit length being equal to one channel-bit period times the writing speed.

The data is written in an optical record carrier having an information layer. The marks representing the data are written along a track in the information layer by a radiation beam. The marks are areas of the information layer having optical characteristics different from their surroundings, which makes optical reading of the marks possible.

FIG. 1b shows the control signal corresponding to the data signal and used for modulating the power of a radiation beam with which the marks are being written on the information layer. It is assumed that the power level of the radiation beam is proportional to the level of the control signal. If this is not the case, the level of the control signal should be adapted to obtain the correct power levels of the radiation beam. FIG. 1b shows two sequences of write pulses for writing two marks. The pulses have an equal width $T_p$ and a pulse period of $T_1$. The centres of gravity of the pulses in the Figure are located at the transitions of the data clock. Alternatively, the trailing edge of the pulses may coincide with the clock transitions. The accuracy of the positioning of the pulses on the clock transitions is preferably within a range of $+/-T_p/5$. A 'high' period of N channel bits in the data signal, a so-called NT mark, is recorded in the embodiment of the recording method shown in FIG. 1 using N−1 write pulses. It is also possible to use N or N−2 write pulses for recording an NT mark. The power in between the pulses is at a first power level of the radiation beam, the so-called bias power level. The height of the pulses corresponds to a write power level. In the period directly following the last pulse of a write sequence, the so-called cooling period, the-radiation power is at a second power level, the cooling power level. The duration of the cooling period is preferably within the range from 0.9 to 1.1 times a channel-bit period $T_1$, more preferably substantially equal to a channel-bit period $T_1$.

The power of the radiation beam preceding and following a write sequence is at a third power level, the erase power level, which level has a height such that previously written marks in between marks to be written are erased. Before the write pulses, the power is maintained at the erase lower level un to the rising edge of the first write pulse. as shown in FIG. 1b. However, this sequence, and also the other mentioned sequences, may start from the bias power level. The bias power level period preceding the first pulse is preferably shorter than one channel-bit period, in order to properly erase previously written marks just before the mark to be written. Following the write pulses and the cooling period, the power is increased from the bias power level to the erase power level. When the trailing edges of the pulses coincide with clock transitions, the power increases to the erase power level also at a clock transition. The FIG. shows a continuous erase power level for a duration of several channel-bit periods. However, the erasure may also be effected by a series of short pulses during such a period.

The erase power level is a predetermined power at which information previously written on a record carrier can be erased. An optical recording device may obtain the required power level for erasing from reading a value for the erase power recorded on the record carrier or by deriving it from one or more test recordings made on the record carrier.

The bias power level in the above pulse sequence corresponds to a relatively low power of the radiation beam between the write pulses, allowing a rapid cooling of the information layer after irradiation by a write pulse. The bias power level is preferably smaller than 30% of the erase power level. At that level there is sufficient cooling of the information layer after a pulse. At higher bias power levels, the effect just written by the pulse may deteriorate due to the insufficient cooling in the period between the pulses and the heating by the subsequent pulse. The actual value of the bias power to be chosen within the range from 0 to 30% of the erase power level depends on the composition of a particular record carrier and may be determined from the minimum of a jitter versus bias power plot measured on the record carrier or from information recorded on the record carrier relating to recording parameters. When the bias power is larger than zero, it gives some preheating for the next write pulse, thereby reducing the write power required in the write pulses.

The level of the radiation power in the cooling period, i.e. the cooling power level, is set to a value within the range from 20% to 75% of the erase power level. A cooling power higher than 75% of the erase power level may cause too much heating after the last pulse of a write sequence, and may have as a consequence, that the erasure following the sequence of pulses for writing a mark starts too early and will erase the last part of the just written mark in an ill-defined way. This will increase the jitter when reading the marks. A cooling power level below the optimum value gives an increase of the jitter caused by the rear edge of the marks, because then previously written marks immediately after the just written mark are not erased properly. The read level is set preferably to approximately 25% of the erase power level, and the bias power level is set preferably to a value within a range from 0 to 30% of the erase power.

Experiments have shown that a range of carriers from a certain manufacturer required a write power level of 7.5 mW, an erase power level of 1.8 mW, a cooling power level of 0.5 mW and a bias power level of 0 mW. A range of carriers from another manufacturer had optimum overwrite characteristics at a cooling power level of 1 mW and a bias power level of 0.5 mW. For some record carriers the optimum bias power level may be equal to a read level of 0.2 mW.

In the above examples of the recording method according to the invention, the writing consists of the formation of amorphous areas in a crystalline surrounding of the phase change material by the sequence of write pulses. It will be apparent that the method is also applicable to record carriers in which a crystalline mark is formed in an amorphous surrounding by the radiation beam at a power level in between the sequences of pulses. In the latter case the terms 'write' and 'erase' for the power levels should be interchanged.

The power levels according to the invention are very suitable for use at different writing speeds. The influence of changes in the writing speed on the write procedure will now be explained with reference to FIG. 2 relating to a disc-shaped record carrier rotating at a constant angular velocity and having a substantially constant linear information density. The writing speed is the magnitude of the velocity between the information layer of the record carrier and a spot formed by the radiation beam on this layer. When writing data on a record carrier the writing speed may change as a function of the position of the irradiating beam on the information layer. Changes in writing speed are encountered when writing on a disc-shaped record carrier rotating at a constant angular velocity. This applies both when writing at a radius-independent data rate and at a radially increasing data rate. FIG. 2 shows graphically the relation between the writing speed V and the inverse of the channel-bit period $T_w$. When the radiation beam scans a track near the outer radius of the writable area of the disc, the writing speed is relatively high. This speed is indicated in FIG. 2 by $V_1$. The channel-bit period $T_w$ belonging to this writing speed is then equal to $T_1$ and is relatively short, as shown in the Figure. When the radiation beam is made to scan a track near the inner radius of the writable area of the disc, the writing speed $V_2$ is smaller than near the outer rim. In order to realise the same linear density of marks along a track, the channel-bit period $T_w$ is made equal to $T_2$, which is longer than $T_1$. This relation is shown in the Figure by a straight line. indicating the proportionality between the writing speed V and the inverse of the channel-bit period $T_w$ or the pulse period. As a consequence, when the writing speed from the outer to the inner radius of the disc decreases for example by a factor of two, the channel-bit period increases substantially by the same factor of two. In other words, the frequency of the data clock increases at increasing radius of the track being written.

A clock circuit which must continuously adapt its frequency to an external parameter, in this case the radius of the track being written, is rather complicated. Therefore, in a special embodiment of the method according to the invention the frequency of the clock is increased in steps when increasing the radius, so the clock circuit can provide a stable clock signal at each step. This step-wise increase is indicated by the staircase line in FIG. 2. In the Figure the area of the disc between the inner and outer radius is divided in ten zones. Within each zone the frequency of the data clock is constant. A disc divided in zones in this way is called a zoned constant angular velocity (ZCAV) disc. In general the number of zones will be between five and thirty for a radii ratio of two, depending on the compromise made between the highest information density of the record carrier and the lowest number of frequency changes of the data clock. This number of zones guarantees that the data clock frequency and the writing speed are everywhere on the disc close to the optimum relation given by the straight line in FIG. 2. Within a zone the number of pulses per unit of length will slightly decrease at an increasing radius. The number of pulses per unit of length averaged over a zone will be independent of the writing speed. The variation of the number of pulses per unit of length will depend on the speed variations and the number of zones. The variation is 18% for five zones with a lowest speed of 5 m/s and a highest speed of 12 m/s.

FIG. 1b shows a control signal at the outer radius of a record carrier, where $T_1$, is the channel-bit period belonging to the writing speed $V_1$ at the outer radius of the disc. FIG. 3 shows the control signal for the inner radius of the disc. FIGS. 1 and 3 are drawn to the same scale. The frequency of the data clock at the inner radius is about a factor of two lower than at the outer radius. Hence, the channel-bit period $T_1$, at the inner radius is about twice as long as the channel-bit period $T_1$, at the outer radius. FIG. 3a shows the data signal for a 6T mark. The appertaining control signal for the write sequence at speed $V_2$ is given in FIG. 3b. The six-channel-bit mark is written by five pulses, their centres of gravity being located at the transitions of the data clock signal indicated by the vertical dashed lines. The width of the pulses is equal to $T_p$, i.e. the same width as the write pulses used near the outer radius. The channel clock period is equal to $T_2$. The timing of the switching on and off of the erase power is also the same as near the outer radius. The thermal behaviour of the record carrier is such that an N-channel-bit mark written at the outer radius has substantially the same length and width as an N-channel-bit mark written near the inner radius. The number of write pulses per unit of length of the written mark is thus independent of the writing speed. This write strategy allows to write marks at different writing speeds by changing only the frequency of the data clock. Therefore, the electronic implementation of the control unit can be relatively simple.

When a pulse sequence comprises a first and last pulse having widths different from $T_p$, these widths are not changed when changing the writing speed. The distance between the first pulse and the next pulse and the distance between the one but last pulse and the last pulse have the same dependence on the writing speed as the distance between pulses having a width $T_p$.

The cooling period after the last pulse in the sequence of FIG. 3b has a duration equal to the channel clock period $T_2$. The duration of the cooling period is in this embodiment of the recording method according to the invention proportional to the inverse of the writing speed V.

The adaptation of the duration of the cooling period according to the write speed can be applied to many types of pulse sequences. A sequence for writing a mark may be represented by the notation K–L(M) in which K and L are numbers giving the width of the first and last pulse respectively in the sequence in units of channel-bit periods and M is an integer giving the number of pulses in a sequence for writing an NT mark. Other pulses in the sequence have a width of half a channel-bit period. The duration of the pulses applies to writing at high speed, i.e. at speed $V_1$, in the above example. The two pulse sequences in FIG. 1b comprising 10 and 2 pulses of width $T_p$ can be represented by 0.5–0.5(N–1). The marks written by such sequences show a low jitter value on reading.

The first write pulse for a mark in FIG. 1b is not preceded by another write pulse as is the case for write pulses in the middle of a sequence. Hence, the information layer is not pre-heated by a preceding pulse when the first write pulse is incident on the information layer. This could cause a lower temperature of the layer and a smaller width of the mark near the leading edge. This transient phenomenon is solved in the recording method shown in FIG. 1 by maintaining the erase power level up to the start of the first write pulse, thereby pre-heating the information layer by the erase power. If more preheating is required, the level of the first pulse of a write sequence may be increased. Alternatively the width of the first pulse may be increased. A width equal to twice the width of the following pulses in the sequence may provide a reliable recording. The pulse sequence is then 1–0.5(N–1). The longer width of the first pulse is preferably combined with maintenance of the erase power level up to the start of the first pulse.

A write pulse sequence requiring a relatively low write power is 1.5–0.5(N–2). This sequence contains 9 pulses for writing an 11T mark.

The quality of the written marks may be improved by increasing the width of the last pulse of a sequence. The extra energy deposited at the rear of the mark improves the erasure of previously written marks at that location. The width of the last pulse is then preferably between 0.6 and 1.5 channel-bit periods. When used for writing information on a phase-change information layer, the width of the last pulse is preferably between 0.6 and 0.75 for phase-change layers having a relatively short crystallisation time, i.e. shorter than 40 ns, and preferably between 1 and 1.5 for phase-change layers having a relatively long crystallisation time, i.e. longer than 100 ns. An example of a sequence having a longer last pulse is 0.5–X(N–1) with X between 0.6 and 1.5 channel-bit periods. A more symmetrical sequence is 1.0–1.0(N–2).

The quality of the recordings made by the above sequences may be improved when they are followed by a cooling period having the power level according to the invention.

FIG. 4 shows control signals according to two embodiments of the recording method according to the invention. FIG. 4a shows the data signal and FIG. 4b the corresponding control signal for writing a six-channel-bit mark for the sequence 1.0–0.5(N–1) at a low writing speed, comparable to FIG. 3b. However, the erase power is switched off at the rising edge of the data signal, i.e. one data clock period plus half a pulse width before the end of the first write pulse. Moreover, the width of the first write pulse is increased by earlier switching on the write power than would be required for a write pulse of width $T_p$, i.e. earlier than $T_p$ before the end of the pulse, which end is at $T_p/2$ after the clock transition of the first pulse. The additional width increases the energy deposited in the information layer at the leading edge of the written mark, thereby compensating for the lack of pre-heating by a pulse preceding this first write pulse. In another embodiment of the recording method the write power in the first write pulse only is increased instead of the width of the first write pulse. The duration of the cooling period is equal to one channel-bit period $T_w$.

FIG. 4c shows a pulse sequence 1.0–0.5(N–1) for writing a 6T mark at a channel-bit Deriod of $T_2$ according to another embodiment. The first pulse has a width twice as long as that of the four subsequent pulses. The width of each of the subsequent pulses is equal to half a channel-bit period $T_1$. The subsequent pulses start at a transition of the data clock. The width of the periods in between subsequent pulses is substantially equal. The cooling period following the last pulse has a width of half a channel-bit period $T_w$.

It will be clear that the different embodiments of pulse sequences for writing a mark as described above can be used in the method according to the invention. The pulse pattern consisting of pulse widths and pulse periods is optimised at a certain speed, and subsequently adapted for writing at a different speed by changing the pulse periods in dependence on the speed and keeping the pulse widths at the same values.

In an embodiment of the recording method, a recording device starts a write action on a record carrier, for instance in the form of a disc, by first reading write parameters stored on the disc. One of these parameters is the write power required for this particular type of disc. Instead of starting to write at the inner radius of the disc, as is usually done on optical discs, the device will preferably first make a test run by writing marks near the outer radius, because the values of the write parameters are more critical near the outer radius than near the inner radius for CAV and ZCAV record carriers. The test run calibrates the write power of the device and determines the value of the pulse width $T_p$ for proper writing at the outer radius. The quality of the test marks can be assessed by measuring e.g. the jitter of the read signal from the marks. The assessment can also be made by counting errors detected by an error correction circuit which is normally present in each optical recording device. Optimisation of the writing speed at a given maximum power of the radiation source leads in general to a write pulse width $T_p$ about equal to half the channel-bit period $T_w$ at the outer radius, i.e. $T_1$. FIG. 1 shows the write pulse sequence near the outer radius, displaying a substantially 50% duty cycle control signal when writing a mark. The 50% duty cycle write pulse near the outer radius is a preferred value; the duty cycles may lie within a range from 40% and 75%. When writing at a different radius of the disc, only the channel-bit period $T_w$ need be adapted to the radius, or, equivalently, to the scanning speed according to the straight line or the stepped line in FIG. 2, while keeping the pulse width and the pulse power substantially constant.

In special cases an improvement of the recording method can be achieved by slightly increasing the write power when reducing the writing speed. Experimentally it has been found for a specific record carrier that a decrease in write speed from 7.6 m/s to 3 m/s requires a write power increase from 10.5 to 13 mW. Hence, a decrease of the write speed by a factor of two and a half requires a 25% increase in the write power. On other record carriers a 10% increase has been measured for the same decrease in writing speed. On the record carrier several write power values for different radii on the disc may have been stored, either by the manufacturer of the medium or by a first user who has made test runs on the record carrier. The recording device can then interpolate between these values to obtain the optimum write power for any radius on the disc. The interpolation may be linear or of an order higher than one. The recording device can also make test recordings at various radii before each write session and determine the appropriate values of the parameters at each radius from these tests.

FIG. 5 shows a recording device according to the invention for recording on a disc-shaped optical recording medium rotating at constant angular velocity. A data signal $S_D$, comprising the information to be recorded, is connected to a control unit 1. The control unit forms a control signal out of the data signal according to one of the above methods. The control signal $S_C$, provided at the output of the control unit 1, is connected to a radiation source 2. The control signal controls the power of a radiation beam 3 generated by the source. The value of the control signal can switch between values representing the write power level, erase power level, bias power level, and cooling power level. The radiation beam is focused by a lens 4 onto an information layer 5 of a record carrier 6 in the form of a disc. Alternatively, the record carrier may be in the form of a tape. The disc-shaped record carrier is rotated around its centre at a constant angular velocity by a motor 7. When the radiation source 2 is displaced in a radial direction with respect to the disc, as indicated by arrow 8, the area of the information layer 5 can be irradiated by the beam 3. A position sensor 9 detects the radial position of the radiation beam, for instance by determining the radial displacement of the radiation source 2 or by deriving the position from signals read from the information layer. The position is fed into a clock generator 10, which generates a data clock signal $S_K$, the frequency of which increases with the radial distance of the radiation beam 3 from the centre of the disc 6. In general, the clock signal is derived from a crystal clock, for instance by dividing the crystal clock signal by a number dependent on the radial distance. The control unit 1 combines the data signal $S_D$ and the clock signal $S_K$ to the control signal $S_C$, e.g. by means of an AND gate, such that the control signal contains write pulses of substantial equal pulse width and equal power synchronised to the clock signal. The control unit may generate the pulses of equal width by means of a mono-stable multivibrator triggered by the data signal and the clock signal. The multivibrator has preferably an adjustable pulse width to allow for different lengths of the first and last pulse of a sequence for writing a mark. The number of write pulses is constant for a unit of length of a written mark. The control unit generates the same sequence of write pulses for writing a certain mark independent of the writing speed, only the rate at which the pulses are generated varies with the writing speed, i.e. with the radial position of the radiation beam. The trailing edge of the last pulse in a write sequence triggers circuit 11, which generates a trigger pulse one data clock period later. This trigger pulse is fed into the control circuit 1. The control circuit sets the control signal $S_C$ to the cooling power level in the time interval between the trailing edge of the last pulse of a sequence and the trigger pulse. In this way the duration of the cooling period is equal to one data clock period, and changes inversely proportional to the radius on the disc or, likewise, to the writing speed.

When the recording device is used for writing at a single speed, the clock generator 10 is preset at a fixed frequency, possibly with corrections for changes in the rotation rate of the record carrier 6. The position sensor 9 need not control the clock generator 10, and may be dispensed with. Circuit 11 may be combined with the control unit 1. The control unit then sets the duration of the cooling period in dependence on the data clock and the values of the writing speed, the numerical aperture and the wavelength of the radiation beam.

FIG. 6 shows part of the control circuit 1 which provides the different levels of the control signal. A current source 12 has four outputs A, B, C and D. Output A provides a current, which, when fed into the radiation source 2, will result in a radiation beam having the bias power level. Likewise, outputs B, C and D provide currents resulting in the cooling power level, the erase power level and the write power level respectively. The current of each output A, B, C and D can be interrupted by a switch 13, 14, 15 and 16 respectively. The switches are operated by a pattern generator 17, controlled by the data signal SD and the clock signal SK. The generator 17 transforms the data signal into sequences of write pulses according to a desired pattern. Different patterns may have been stored in a memory of the control unit 1, from which they are fetched the moment a mark corresponding to a certain pattern has to be written. Depending on the power level present at a certain instant in a sequence, the appropriate switch 13–16 is closed. In the embodiment shown, at most one switch is closed at a time. Alternatively, it is possible to simplify the switching by adding currents. For instance, one output of the current source provides the current corresponding to the bias power level and another output the current corresponding to the write power level minus the bias power level. During a sequence the switch for the bias power level remains closed and the switch for the write power level minus the bias power level is opened and closed in dependence on the pulse sequence. After addition of the two output currents, the desired current for the control of the radiation source is obtained.

FIG. 7 shows the results of recording experiments on phase-change record carriers using the known recording method and the method according to the invention. During the experiments marks were written at a constant speed of 4.3 m/s in the record carrier using a radiation beam having a wavelength of 488 nm and an NA of 0.60. The channel-bit length was 134 nm. A 0.5–0.5(N−1) pulse sequence was used with a 50% duty cycle and a duration of the cooling period equal to one channel-bit period. The following powers have been used in the known method: write power level 6.0 mW, erase power level 2.0 mW, bias power level 0.2 mW. In the known method the bias power level and the cooling power level have the same value. In the method according to the invention the same write and erase power levels have been used, but the bias power level was set at 0 mW and the cooling power level was set at 0.5 mW. Random, EFM-plus coded data has been overwritten repeatedly in the same area of the phase-change record carrier. The marks were subsequently read and the jitter of the resulting read signal was determined, both for the leading and the trailing edge of the written marks.

FIG. 7 shows the result of measurements on the information signal after a certain number of Direct-Overwrite (DOW) cycles. The drawn line and the dotted line indicate the measured jitter of the trailing and leading edge respectively of the marks written by using the known method. The trailing-edge jitter shows an initial increase and a subsequent decrease, whereas the leading-edge jitter increases after about 100 DOW cycles.

The dashed line and the dot and dash line indicate the measured jitter of the trailing and leading edge respectively of the marks written by using the method according to the invention. It is apparent that both the leading and trailing-edge jitter are lower than when using the known method. The 0.2 mW power level of the known method is apparently too high for the bias power level and too low for the cooling power level. The initial increase of the trailing-edge jitter has almost disappeared, and the increase of the leading-edge jitter has been reduced substantially.

In an experiment on another record carrier the same parameter values as in the above experiments have been used, except for the optimum power levels. The levels used in the known method were: write power level 6 mW, erase power level 2 mW and bias and cooling power level each 0.5 mW. In the method according to the invention the same values have been used for the write and erase power levels, whereas the bias power level was 0 mW and the cooling power level 0.5 mW. The improvement of the jitter was most marked for the leading-edge jitter whereas the improvement of the trailing-edge jitter was smaller. This can be explained from the fact that the compromise value of 0.5 mW in the known method was too high for the bias power level and correct for the cooling power level.

The advantages mentioned above for the specified ranges of the cooling period duration are not only obtained in methods for recording at different speeds but also in methods for recording in a record carrier at a single speed.

The recording method according to the invention is eminently suitable for recording marks on a phase-change information layer, especially for writing amorphous marks in a crystalline information layer. The short write pulses, especially at the inner radius of a disc, allow a proper control of the write process in view of the amorphisation and re-crystallisation of the phase-change material.

The recording method according to the invention can also be used for recording data on different record carriers designed for different writing speeds, for instance because of different types of information layers in the discs. The pulse width is determined for the channel-bit period of the record carrier having the highest writing speed. When recording a disc at a lower writing speed, the pulse width is not changed, but only the channel-bit period is increased in accordance with the specification of the record carrier. Hence, a recording device can record on different types of record carriers by merely changing the channel-bit period and, if appropriate, the write power. The optimum values for the bias and cooling power levels may be found by minimizing the leading edge and trailing-edge jitter as a function of the bias and cooling power level respectively.

What is claimed is:

1. A method of recording marks representing data in an information layer of an optical record carrier by irradiating the information layer by a pulsed radiation beam, each mark being written by a sequence of pulses, the radiation beam has a first, bias power level between the pulses, a second, cooling power level after the last pulse of the sequence, followed by a third, erase power level, and in which the first power level is lower than the second power level and the second power level is lower than the third power level.

2. The method of claim 1, wherein the second power level is in a range from 0.20 to 0.75 times the third power level.

3. The method of claim 1, wherein the first power level is within a range from 0 to 0.30 times the third power level.

4. The method of claim 1 in which the writing is performed at different writing speeds, wherein the second power level is maintained during a cooling period, the duration of which is dependent on the writing speed.

5. The method of claim 1, wherein the second power level is maintained during a cooling period, the duration of which lies between 0.09 and 0.27 times $\lambda/(NA\ v)$, where $\lambda$ is the wavelength of the radiation beam, NA is the numerical aperture of the beam on the information layer and $v$ is the writing speed.

6. The method of claim 1, in which:

the second power level is in a range from 0.20 to 0.75 times the third power level;

the first power level is within a range from 0 to 0.30 times the third power level;

the writing is performed at different writing speeds, wherein the second power level is maintained during a cooling period, the duration of which is dependent on the writing speed;

the second power level is maintained during a cooling period, the duration of which lies between 0.09 and 0.27 times $\lambda/(NA\, v)$, where $\lambda$ is the wavelength of the radiation beam, NA is the numerical aperture of the beam on the information layer and v is the writing speed.

7. An optical recording device for recording data in the form of marks on an information layer of a record carrier by a radiation beam, the device comprising:

a radiation source providing the radiation beam; and control unit means for providing a sequence of pulses for writing a mark and for controlling the power of the radiation beam for automatically providing a first, bias power level between the pulses, a second cooling power level after the last pulse of the sequence, followed by a third, erase power level, and in which the first power level is lower than the second power level and the second power level is lower than the third power level.

8. The device of claim 7, wherein the second power level is in a range from 0.20 to 0.75 times the third power level.

9. The device of claim 7, wherein the first power level is within a range from 0 to 0.30 times the third power level.

10. The device of claim 7, in which the writing is performed at different writing speeds, wherein the second power level is maintained during a cooling period, the duration of which is dependent on the writing speed.

11. The device of claim 7, wherein the second power level is maintained during a cooling period, the duration of which lies between 0.09 and 0.27 times $\lambda/(NA\, v)$, where $\lambda$ is the wavelength of the radiation beam, NA is the numerical aperture of the beam on the information layer and v is the writing speed.

* * * * *